(12) United States Patent
Sun et al.

(10) Patent No.: US 10,860,148 B2
(45) Date of Patent: Dec. 8, 2020

(54) IONIC TOUCH PANEL

(71) Applicant: SEOUL NATIONAL UNIVERSITY R&DB FOUNDATION, Seoul (KR)

(72) Inventors: Jeong Yun Sun, Seoul (KR); Kyu Hwan Oh, Seoul (KR); Chong Chan Kim, Seoul (KR); Hyun Hee Lee, Gyeonggi-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/321,090

(22) PCT Filed: Jun. 14, 2017

(86) PCT No.: PCT/KR2017/006182
§ 371 (c)(1),
(2) Date: Jan. 28, 2019

(87) PCT Pub. No.: WO2018/021684
PCT Pub. Date: Feb. 1, 2018

(65) Prior Publication Data
US 2019/0163300 A1    May 30, 2019

(30) Foreign Application Priority Data
Jul. 29, 2016 (KR) .................. 10-2016-0097219

(51) Int. Cl.
*G06F 3/044* (2006.01)
*G06F 3/041* (2006.01)
(Continued)

(52) U.S. Cl.
CPC ......... *G06F 3/044* (2013.01); *G01N 27/3335* (2013.01); *G06F 3/041* (2013.01);
(Continued)

(58) Field of Classification Search
CPC .. G01N 27/305; G01N 27/02; G01N 27/3335; G01L 1/00; G01L 1/142;
(Continued)

(56) References Cited

U.S. PATENT DOCUMENTS

| 10,302,586 B2 * | 5/2019 | Sun ..................... H01G 9/022 |
| 2015/0268108 A1 * | 9/2015 | LaBelle ................ G01L 1/205 |
| | | 204/400 |

(Continued)

FOREIGN PATENT DOCUMENTS

| CN | 107316945 A * | 11/2017 | ........... B01J 20/267 |
| EP | 0 341 190 A2 | 11/1989 | |

(Continued)

OTHER PUBLICATIONS

Junpeng Li, "Healable Capacitive Touch Screen Sensors Based on Transparent Composite Electrodes Comprising Silver Nanowires and a Furan/Maleimide Diels Alder Cycloaddition Polymer" vol. 8, No. 12, p. 12874-12882, 2014.
(Continued)

*Primary Examiner* — Sardis F Azongha
(74) *Attorney, Agent, or Firm* — Stuart H. Mayer; Mayer & Williams PC

(57) ABSTRACT

The present invention relates to an ionic touch panel, and more particularly, to an ionic touch panel using hydrogel for a touch panel and having flexibility, stretchability, and biocompatibility. An ionic touch panel according to an embodiment of the present invention includes a hydrogel touch unit 100 containing salt, and electrodes connected to at least two parts of the hydrogel touch unit.

16 Claims, 17 Drawing Sheets

(51) Int. Cl.
*G01N 27/333* (2006.01)
*G06F 3/045* (2006.01)

(52) U.S. Cl.
CPC ............ *G06F 3/045* (2013.01); *G06F 3/0412* (2013.01); *G06F 2203/04111* (2013.01)

(58) Field of Classification Search
CPC . G01L 1/12; G01L 1/144; G01L 1/205; G06F 3/041; G06F 3/044; G06F 3/0412; G06F 3/045
See application file for complete search history.

(56) References Cited

U.S. PATENT DOCUMENTS

| | | | |
|---|---|---|---|
| 2016/0025669 A1 | 1/2016 | Sun et al. | |
| 2017/0356815 A1* | 12/2017 | Madden | G01L 1/146 |
| 2018/0038745 A1* | 2/2018 | Madden | G01L 11/00 |
| 2018/0244858 A1* | 8/2018 | Illeperuma | C08K 3/16 |
| 2019/0198815 A1* | 6/2019 | Li | G06F 3/0416 |

FOREIGN PATENT DOCUMENTS

| | | |
|---|---|---|
| EP | 0 942 390 A2 | 9/1999 |
| KR | 1020130045801 | 5/2013 |
| KR | 1020150143432 | 12/2015 |
| WO | 2016086306 A1 | 6/2016 |

OTHER PUBLICATIONS

Daniel Buenger, "Hydrogels in sensing applications" Progress in Polymer Science 37 (2012) 1678-1719.
Nancy Owano, Researchers present a special gel for touchscreen buttons, Sep. 24, 2015, 2 pages.
Sarwar, et al. "Transparent and Conformal 'Plezolonic' Touch Sensor" Visual Communications and Image Processing; Jan. 20, 2004-Jan. 20, 2004; San Jose, vol. 9430, Apr. 1, 2015 (Apr. 1, 2015).
Miruchna et al., "GelTouch: LocalizedTactileFeedback ThroughThin,ProgrammableGel" Proceedings of the 28th Annual ACM Symposium on User Interface Software & Technology, UIST '15, ACM Press, New York, New York, USA, Nov. 5, 2015 (Nov. 5, 2015), pp. 3-10.
Jeong-Yun Sun et al. "Ionic Skin" Advanced Materials, VCH Publishers, vol. 26, No. 45, Sep. 30, 2014, pp. 7608-76014.
Keplinger et al. "Stretchable, Transparent, Ionic Conductors" Science, vol. 341, Aug. 30, 2013, pp. 984-987.

* cited by examiner (a)

(b)

IONIC TOUCH PANEL

TECHNICAL FIELD

The present invention relates to an ionic touch panel, and more particularly, to an ionic touch panel using hydrogel for a touch panel and having flexibility, stretchability, and biocompatibility.

BACKGROUND ART

Touch panels have been continuously developed, and have become popular. Touch systems are indispensable to current electronic devices and applications thereof. As a simple and intuitive interface, a touch panel may be integrated into a display and may save the space of a display device. Touch panels may be divided into resistive sensing systems, electrostatic sensing systems, etc. and may be used in mobile phones, computers, ticket machines, information kiosks, etc.

A transparent electrode film needs to be used to implement a resistive or electrostatic touch sensing system. Specifically, indium tin oxide (ITO) is commonly used as the transparent electrode film due to its low sheet resistance (<200 Ω/sq) and excellent transmittance. However, next-generation touch panels are expected to be used in flexible devices, wearable devices, and even devices integrable into body parts. Since demands for human-computer interaction increase, the next-generation touch panels are required to have high stretchability, flexibility, and biocompatibility.

DETAILED DESCRIPTION OF THE INVENTION

Technical Problem

Existing touch panels were developed based on a hard and brittle transparent electrode material such as indium tin oxide (ITO) and thus may not easily achieve high stretchability, flexibility, and biocompatibility. Due to high stretchability and visible light transmittance, a polymer electrode material, carbon nanotubes (CNT), graphene, metal nanowires, etc. are regarded as alternatives to the conventional transparent electrode material such as ITO. However, these materials have sheet resistances rapidly increasing when stretched, and exert fatigue failure when repeatedly stretched. Furthermore, since biocompatibility of the materials has not been verified, more research is needed on integrability into a body part.

The present invention provides an ionic touch panel having a high stretchability, a high flexibility, and a high visible light transmittance.

The present invention also provides a biocompatible ionic touch panel integrable into a body part and thus usable as a next-generation touch panel. However, the scope of the present invention range is not limited thereto.

Technical Solution

According to an aspect of the present invention, there is provided an ionic touch panel including a hydrogel touch unit containing salt, and electrodes connected to at least two parts of the hydrogel touch unit.

When the hydrogel touch unit is touched, touch currents may be induced from the electrodes to a touch point.

The salt may have a molar concentration of 0.01M to 2M.

Magnitudes of a baseline current and a touch current flowing through the hydrogel touch unit may decrease as the molar concentration of the salt increases.

The hydrogel touch unit may have a transmittance of 98% in a visible light band.

When the hydrogel touch unit is stretched, a baseline current and a touch current flowing through the hydrogel touch unit may increase.

The hydrogel touch unit may have a strip, rectangular, or circular shape.

The hydrogel touch unit may have a strip shape, and the electrodes may be connected to two ends of the hydrogel touch unit.

Assuming that the hydrogel touch unit has a length L and a total current $I_t$ flows through the hydrogel touch unit, when the hydrogel touch unit is touched at a point corresponding to a length $\alpha L$ from an end of the hydrogel touch unit and a length $(1-\alpha)L$ from the other end of the hydrogel touch unit, a touch location $\alpha$ may be calculated using Equation (1) expressed as $(1-\alpha)=I_1/I_t$ and Equation (2) expressed as $\alpha=I_2/I_t$ (where $I_1$ denotes a current measured at the end and $I_2$ denotes a current measured at the other end, and $0 \leq \alpha \leq 1$).

Assuming that a current measured at an end of the hydrogel touch unit is denoted by $I_1$ and a current measured at the other end of the hydrogel touch unit is denoted by $I_2$, a sum of $I_1$ and $I_2$ is constant and $I_1$ and $I_2$ may have values inversely proportional to each other based on a touch location of the hydrogel touch unit.

The hydrogel touch unit may have a rectangular shape, and the electrodes may be connected to four corners of the hydrogel touch unit.

When the hydrogel touch unit is touched, touch currents may be induced from the electrodes connected to the corners, to a touch point, and a location of the touch point may be calculated based on values of the touch currents.

A magnitude of a touch current induced from a corner to the touch point may increase as a distance between the corner and the touch point decreases.

Assuming that a touch coordinate on the hydrogel touch unit is $(\alpha, \beta)$ (where $0 \leq \alpha \leq 1$ and $0 \leq \beta \leq 1$, $\alpha$ and $\beta$ may be calculated using Equation (1) expressed as $\alpha \propto (I_2+I_3)/(I_1+I_2+I_3+I_4)$ and Equation (2) expressed as $\beta \propto (I_1+I_2)/(I_1+I_2+I_3+I_4)$ (where $I_1, I_2, I_3$, and $I_4$ denote currents measured at the four corners of the hydrogel touch unit).

The hydrogel touch unit may be attached to a substrate, and the substrate may be integrable into and insulative to a body part.

The substrate may have a thickness of 1 mm to 6 mm.

According to another aspect of the present invention, there is provided a method of manufacturing an ionic touch panel, the method including preparing a hydrogel solution by dissolving hydrogel monomer powder and salt in deionized (DI) water and then sequentially adding a cross-linking agent of hydrogel, an initiator, and an accelerator to the solution, producing the hydrogel solution into a hydrogel touch unit having a certain shape, and connecting electrodes to at least two parts of the hydrogel touch unit.

According to another aspect of the present invention, there is provided an ionic touch panel system including an ionic touch panel including a hydrogel touch unit containing salt, and electrodes connected to at least two parts of the hydrogel touch unit, a controller board electrically connected to the ionic touch panel to calculate a location of a touch point, and a terminal device for receiving location information of the touch point from the controller board, and displaying the location information.

Advantageous Effects

As described above, according to an embodiment of the present invention, an ionic touch panel having a high stretchability, a high flexibility, and a high visible light transmittance may be provided.

Furthermore, according to an embodiment of the present invention, a biocompatible ionic touch panel integrable into a body part and thus usable as a next-generation touch panel may be provided.

DESCRIPTION OF THE DRAWINGS

FIGS. 29A, 29B and 298C illustrate images showing various application examples of the ionic touch panel according to the fourth embodiment of the present invention.

Figure 1:
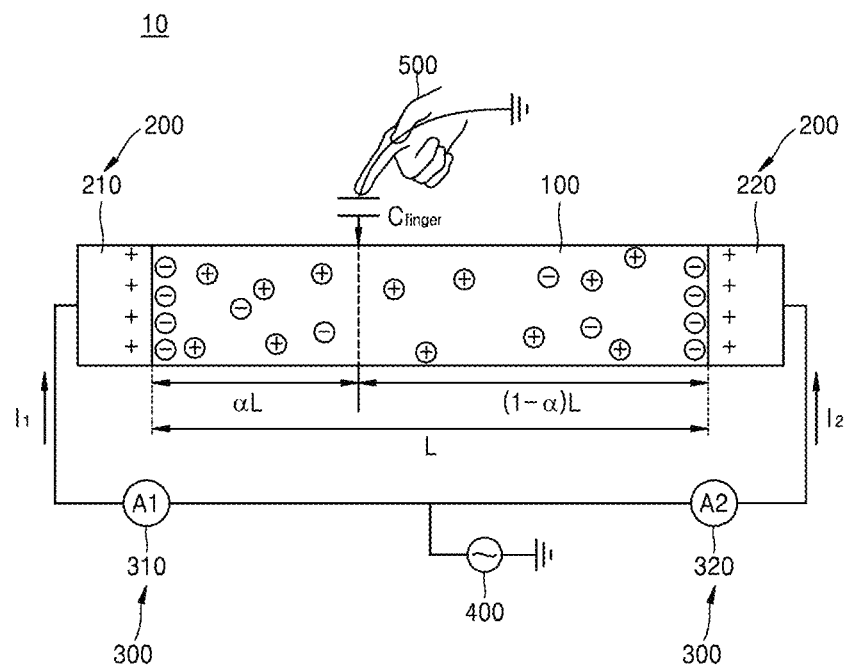
FIG. 1 is a schematic view of a strip-shaped ionic touch panel according to a first embodiment of the present invention.

EXPLANATION OF REFERENCE NUMBERALS 10 to 40: Ionic touch panels
70: Controller board
90: Computer
100: Hydrogel touch unit, or hydrogel containing salt
200: Electrodes
300: Current meters
400: Power source
500: Finger, or grounding by touch
M1, M2: Monitors
TP1 to TP4: Touch points

MODE OF THE INVENTION

The following detailed descriptions of the invention will be made with reference to the accompanying drawings illustrating specific embodiments of the invention by way of example. These embodiments will be described in detail such that the invention can be carried out by one of ordinary skill in the art. It should be understood that various embodiments of the invention are different, but are not necessarily mutually exclusive. For example, a specific shape, structure, and characteristic of an embodiment described herein may be implemented in another embodiment without departing from the scope of the invention. In addition, it should be understood that a position or placement of each component in each disclosed embodiment may be changed without departing from the scope of the invention. Accordingly, there is no intent to limit the invention to the following detailed descriptions. The scope of the invention is defined by the appended claims and encompasses all equivalents that fall within the scope of the appended claims. In the drawings, like reference numerals denote like functions and length, area, thickness, etc. of elements may be exaggerated for convenience of explanation.

Hereinafter, to allow one of ordinary skill in the art to easily carry out the invention, embodiments of the present invention will be described in detail with reference to the accompanying drawings.

Ionic touch panels 10 to 40 according to the present invention are characterized in that hydrogel 100 containing ionic salt is used and in that electrodes 200 are connected to parts of the hydrogel 100. In this specification, operating principles of a one-dimensional (1D) ionic touch panel 10 will be mainly described according to a first embodiment, and actual implementation of a 2D ionic touch panel 20 expanded from the 1D ionic touch panel 10 will be described according to a second embodiment. Stretchability of an ionic touch panel 30 will be mainly described according to a third embodiment, and application of an ionic touch panel 40 as an epidermal touch panel integrable into or attachable to a body part will be described according to a fourth embodiment. The operating principles and structure of the ionic touch panel 10 according to the first embodiment are equally applicable to the ionic touch panels 20, 30, and 40 according to the second to fourth embodiments.

Strip-Shaped Ionic Touch Panel 10

FIG. 1 is a schematic view of a strip-shaped ionic touch panel 10 according to a first embodiment of the present invention. The strip-shaped ionic touch panel 10 may be understood as a 1D ionic touch panel 10.

Referring to FIG. 1, the ionic touch panel 10 includes a hydrogel touch unit 100 and electrodes 200 (including 210 and 220). The ionic touch panel 10 may further include current meters 300 for measuring currents flowing through the hydrogel touch unit 100, and a power source 400 for applying a voltage to the hydrogel touch unit 100 through the electrodes 200.

The hydrogel touch unit 100 may include hydrogel, and more particularly, hydrogel containing salt. Since a user of the ionic touch panel 10 touches the surface of the hydrogel, the hydrogel (i.e., the hydrogel containing salt) is referred to as the hydrogel touch unit 100 in this specification.

Hydrogel is a hydrophilic polymer network swollen with a large amount of water. Hydrogel is as soft as tissues and has a very high stretchability. Most types of hydrogel are biocompatible and thus may be used to deliver drugs, replace tissues, and treat wounds. Some types of hydrogel have a transmittance of 99% in an entire visible light band and thus may clearly transmit optical data. Hydrogel contains a large amount of water and thus may be used as an ionic conductor by dissolving ions in the water. Accordingly, the present invention may use hydrogel for a touch panel to utilize high stretchability, biocompatibility, and transmittance of the hydrogel. The present invention uses polyacrylamide (PAAm) gel but is not limited thereto. Any known type of hydrogel may also be used as long as high stretchability, biocompatibility, and transmittance are achievable. For example, gel containing another ionic solvent such as PAAm, polyhydroxyethylmethacrylate, or polyvinyl alcohol may also be used.

The hydrogel touch unit 100 may contain ionic salt. The ionic salt may include chlorine (Cl)-based salt meltable in water (e.g., LiCl, NaCl, $CaCl_2$, KCl, MgCl, or $BaCl_2$), $(NO_3)^-$, $SO_4^{2-}$, or $S^-$. Alternatively, any known type of salt may also be used as long as ions are formable in an aqueous solution. The salt allows a current to flow due to motion of ions in the hydrogel touch unit 100. Particularly, a LiCl aqueous solution has hygroscopic properties for absorbing moisture and thus may be used as an evaporation inhibitor to prevent evaporation of moisture from the hydrogel. A molar concentration of the salt may be determined considering moisture evaporation and resistivity of the hydrogel and is not particularly limited. When touched, the ionic touch panel 10-40 may calculate a location of a touch point by detecting a variation in capacitance on the ionic touch panel 10. In this regard, the electrodes 200 may be connected to at least two parts of the hydrogel touch unit 100. The electrodes 200 may use metal (e.g., platinum (Pt), copper (Cu), silver (Ag), gold (Au), molybdenum (Mo), or aluminum (Al)), a transparent material, polymer, graphene, or the like. Particularly, using Pt, Au, Ag, or the like as the material of the electrodes 200, current loss may be reduced and conductivity may be increased.

When a voltage exceeding a certain voltage level is applied, an electrochemical reaction may occur at interfaces between the hydrogel touch unit 100 and the electrodes 200. Accordingly, the power source 400 may apply an alternating current (AC) voltage of, for example, −10V to 10V within a stable range in which an electrochemical reaction does not occur.

Referring back to FIG. 1, the first embodiment of the present invention is as described below. The hydrogel touch unit 100 is provided in a strip shape having a size of 2 cm (width)×15 cm (length)×3 mm (thickness), and uses PAAm gel containing a 2M LiCl aqueous solution as salt.

Acrylamide (AAm) (Sigma, A8887) and LiCl (Sigma, L4408) are used as base materials of the hydrogel touch unit 100, and N,N-methylenebisacrylamide (MBAA) (Sigma, M7279) is used as a cross-linking agent of the AAm gel. Ammonium persulfate (AP) (Sigma, A9164) and N,N,N', N'-tetramethylethylenediamine (TEMED) (Sigma, T7024) are used as a thermal initiator and a gelling accelerator, respectively. The hydrogel touch unit 100 is synthesized by dissolving AAm monomer powder and LiCl in deionized (DI) water. Molar concentrations of AAm and LiCl are 2.17M and 2M, and the cross-linking agent (i.e., MBAA) and the initiator (i.e., AP) are added by 0.06 wt % and 0.16 wt % with respect to the AAm monomer. The mixture is sonicated and degassed in a vacuum chamber, and then the accelerator (i.e., TEMED) is lastly added by 0.25 wt % with respect to the AAm monomer. The solution is poured into an acrylic mold in different sizes and shapes, and the hydrogel touch unit 100 is prepared after an hour.

The Pt electrodes 200 may be provided at two ends of the hydrogel touch unit 100 and may be connected to the AC power source 400 (e.g., a function generator (Model 33612A, Agilent)). The two current meters 300 (including 310 and 320; Model 34461A, Agilent) are provided at two ends of the strip-shaped hydrogel touch unit 100 to measure root mean square (RMS) values of alternating currents. A driving voltage may be −0.6V to 0.6V, and a frequency may be 10 kHz to 100 kHz.

When the strip-shaped hydrogel touch unit 100 is touched, a finger 500 may be capacitively connected to the hydrogel touch unit 100 such that a current may flow through the finger 500 to the ground.

The ionic touch panel 10 of FIG. 1 may include resistive parts and a capacitive part. The resistive parts indicate virtual parts of the strip-shaped hydrogel touch unit 100 divided by a touch point. When a point α (left and right ends of the hydrogel touch unit 100 are respectively expressed as α=0 and α=1) of the hydrogel touch unit 100 having a length of L is touched, a left part of the touch point may have a length of αL and a right part thereof may have a length of (1−α)L. A resistance may be determined to be linearly proportional to a length virtually divided from the point α. On the other hand, the capacitive part may have a constant value given by an electrical double layer (EDL) and the finger 500.

Figure 2:
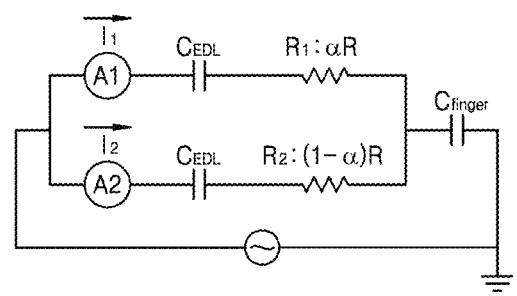
FIG. 2 is a view showing an electrical circuit in a case when the ionic touch panel according to the first embodiment of the present invention is touched.

FIG. 2 is a view showing an electrical circuit in a case when the ionic touch panel 10 according to the first embodiment of the present invention is touched.

Referring to FIG. 2, the ionic touch panel 10 is divided into two resistive parts by a touch point. Each resistor is connected to a capacitor $C_{EDL}$ in series with an EDL and the current meter 300 (e.g., 310 or 320), and the two resistive parts have a parallel form. Such a parallel circuit may be connected in series with a capacitor $C_{finger}$ generated by the finger 500. In FIG. 2, due to a high capacitance and a high driving frequency of the EDL, the effect of the capacitor $C_{EDL}$ generated by the EDL may be ignored.

A current may flow through the hydrogel touch unit 100 to the grounded finger 500. The current passes through the capacitors $C_{EDL}$ and resistors $R_1$ and $R_2$ of the hydrogel touch unit 100 and then passes through the capacitor $C_{finger}$ (hereinafter, the current passing through the capacitor $C_{finger}$ is called a "touch current"). Therefore, current measurement by the current meters 300 relates to only the resistors $R_1$ and $R_2$, the capacitors $C_{EDL}$, and the capacitor $C_{finger}$.

Resistances of the currents passing through the two divided paths are expressed as shown in Equations 1 and 2.

$$R_1 = \alpha R \qquad \text{[Equation 1]}$$

$$R_2 = (1-\alpha)R \qquad \text{[Equation 2]}$$

Impedances Z of the two divided paths are expressed as shown in Equation 3.

$$Z_1 = R_1 - j\{1/(2\pi f C_{EDL})\}, Z_2 = R_2 - j\{1/(2\pi f C_{EDL})\} \qquad \text{[Equation 3]}$$

Since a value of the capacitor $C_{EDL}$ per unit area of the EDL is about $10^{-1}$ F/m², an area of the EDL is about $10^{-5}$ m², and a frequency is 17 kHz, a reactance of the capacitor $C_{EDL}$ is $-j\{1/2\pi fC\} \approx -9j$. Since the reactance of the capacitor $C_{EDL}$ is much less than a resistance R ($\approx 200\Omega$) of the ionic touch panel 10, based on $Z=200\Omega-9j\approx 200.2\angle -2.57$, the impedance Z is approximately equal to the resistance ($Z\approx R$). Such an approximation generates a touch current calculated according to a ratio between two resistances.

A total current of the circuit is expressed as shown in Equation 4, and currents of the two paths are expressed as shown in Equations 5 and 6.

$$I_{total} = V/\{(R_1R_2)/(R_1+R_2) - j(1/(2\pi fC_{finger}))\} \qquad \text{[Equation 4]}$$

$$I_1 \approx I_{total} \times \{R_2/(R_1+R_2)\} = (1-\alpha)I_{total} \qquad \text{[Equation 5]}$$

$$I_2 \approx I_{total} \times \{R_1/(R_1+R_2)\} = \alpha I_{total} \qquad \text{[Equation 6]}$$

Therefore, when Equations 1 and 2 are substituted in Equations 5 and 6, Equations 7 and 8 are obtained as shown below.

$$(1-\alpha) = I_1/I_t \qquad \text{[Equation 7]}$$

$$\alpha = I_2/I_t \qquad \text{[Equation 8]}$$

Accordingly, location information of the touch point may be obtained based on $I_1$ and $I_2$.

Figure 3:
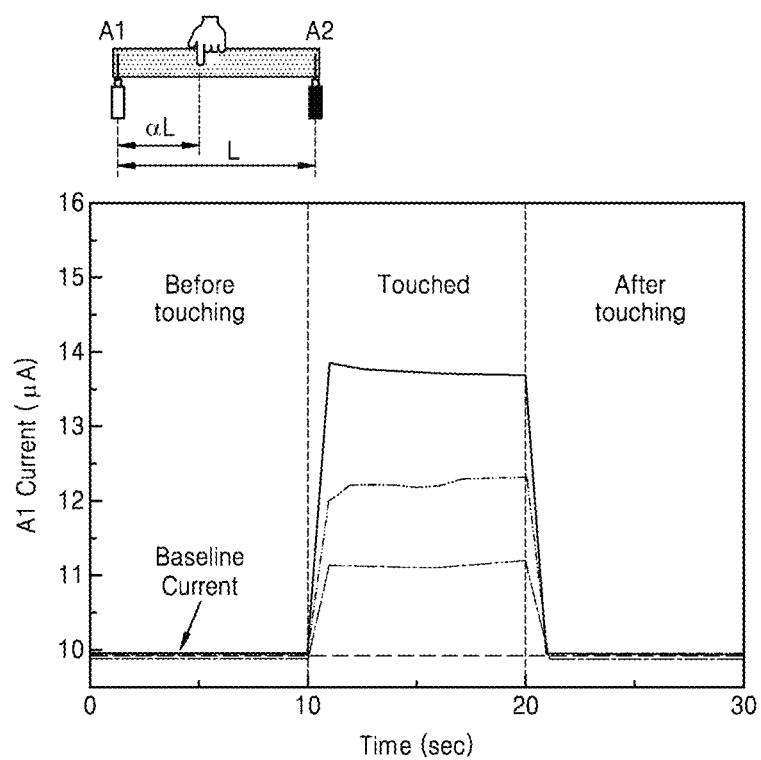
FIG. 3 is a graph showing a current measurement result of the ionic touch panel according to the first embodiment of the present invention, based on a touch location.
Figure 4:
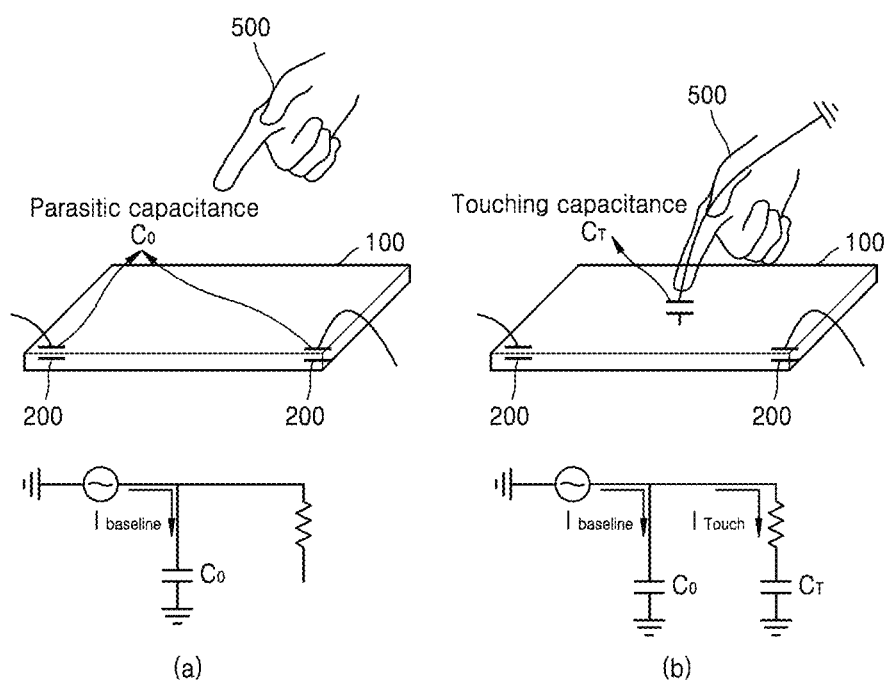
FIGS. 4A and 4B show a parasitic capacitance and a baseline current of an ionic touch panel according to an embodiment of the present invention.

FIG. 3 is a graph showing a current measurement result of the ionic touch panel 10 according to the first embodiment of the present invention, based on a touch location. FIG. 4 shows a parasitic capacitance and a baseline current of an ionic touch panel according to an embodiment of the present invention.

Referring to FIG. 3 and (a) of FIG. 4, before touching, a baseline current of a μA unit occurs. The baseline current may be understood as a parasitic current corresponding to a parasitic capacitance generated between the hydrogel touch unit 100 and a peripheral environment such as a circuit. When the hydrogel touch unit 100 is not touched, theoretically, no electrical potential gradient exists and thus no current flows in the ionic touch panel 10. However, in a steady state, the baseline current occurs due to a parasitic current corresponding to a parasitic capacitance. The baseline current flows through an electrical path of the peripheral environment to the ground. In the present invention, it is determined that the parasitic capacitance exists between the ionic touch panel 10 and the grounded peripheral environment. The parasitic capacitance is a significant factor for determining the baseline current that can be considered as a noise signal, and efforts for reducing the baseline current are required.

Referring to FIG. 3 and (b) of FIG. 4, when the hydrogel touch unit 100 is touched with the finger 500, an additional current from the electrode 200 to the finger 500 occurs, and the current meter 300 may detect a sum of the baseline current and the additionally induced current. The induced current may be called a "touch current" as described above.

Figure 5:
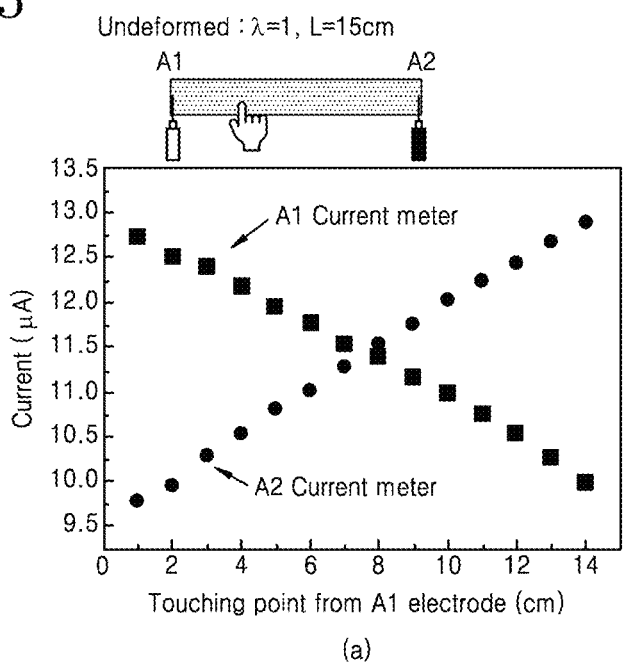
FIGS. 5A and 5B illustrate graphs showing the relationship between a touch location and a measured current in the ionic touch panel according to the first embodiment of the present invention.
Figure 5:
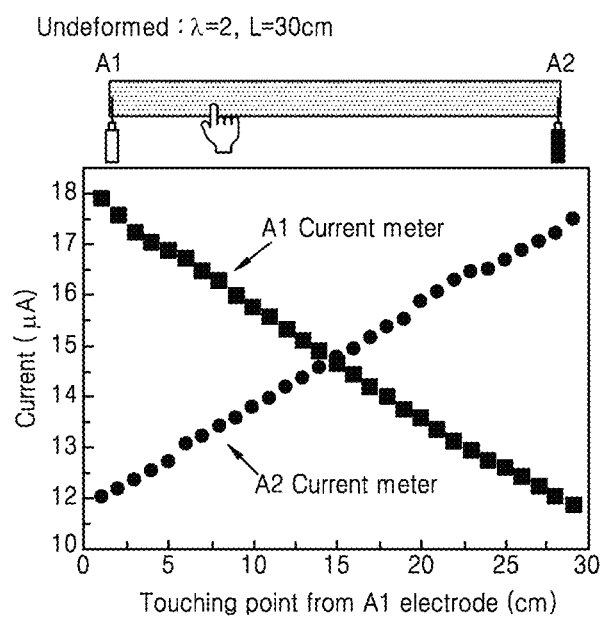

FIG. 5 illustrates graphs showing the relationship between a touch location and a measured current in the ionic touch panel 10 according to the first embodiment of the present invention.

Touch currents are proportional to proximities from the electrodes 200 to a touch point. The strip-shaped hydrogel touch unit 100 having a length of 15 cm is touched at every 1 cm from a left end to a right end thereof, and currents measured by an A1 current meter 310 and an A2 current meter 320 are shown in (a) of FIG. 5. When a sum of $I_1$ and $I_2$ is constant and $I_2$ increases as a touch point moves rightward, $I_1$ linearly decreases.

The strip-shaped hydrogel touch unit 100 is deformable and stretchable. When the strip-shaped hydrogel touch unit 100 is stretched to double the length thereof to 30 cm (λ=2), an area of the strip-shaped hydrogel touch unit 100 may increase and thus a parasitic capacitance may also increase. Accordingly, compared to a state before being stretched, both a baseline current and a touch current may increase. The current behavior in the stretched state based on the interval of touch points is as shown in (b) of FIG. 5, and is similar to that shown in (a) of FIG. 5.

Resistances of Ionic Touch Panels 10 to 40 Having Various Molar Concentrations

Figure 6:
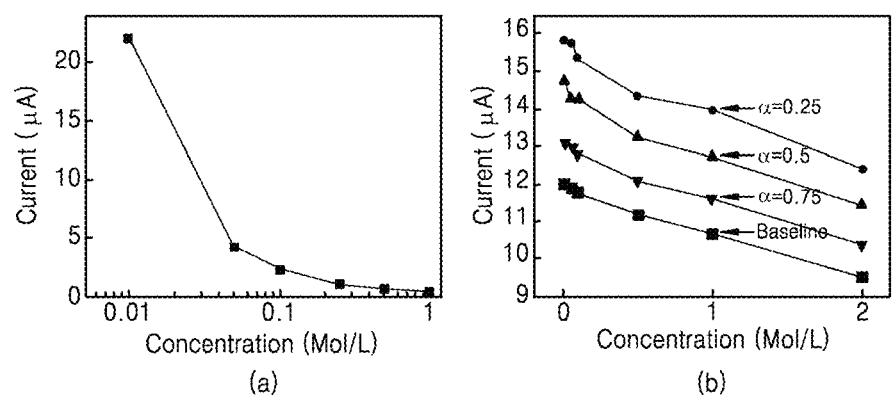
FIGS. 6A and 6B illustrate graphs showing a resistance and a touch current of an ionic touch panel according to an embodiment of the present invention, based on a molar concentration.

FIG. 6 illustrates graphs showing a resistance and a touch current of an ionic touch panel 10 according to an embodiment of the present invention, based on a molar concentration. The relationship between a molar concentration of salt and a resistance and a current of hydrogel will be described with reference to FIG. 6.

Resistance variations of the ionic touch panels 10 to 40 based on a molar concentration will now be described. 2 cm (width)×15 cm (length)×3 mm (thickness) strip-shaped hydrogel samples including 0.01M, 0.05M, 0.1M, 0.5M, 1M, and 2M LiCl solutions are used. Resistances are measured using an inductance, capacitance, and resistance (LCR) meter (E4980AL-100, Agilent). As shown in Equation 9, when a molar concentration linearly proportional to 1/ρ increases, a resistance R decreases.

$$R = \rho L/S \quad \text{[Equation 9]}$$

(where S denotes a cross-sectional area of a hydrogel touch unit and L denotes a length of the hydrogel touch unit.)

Herein, ρ may be replaced by c/M (where c denotes a constant value and M denotes a molar concentration of LiCl), and Equation 9 may be rewritten as R=cL/SM. Referring to (a) of FIG. 6, it is shown that the value of the resistance follows this equation.

Since the molar concentration determines the resistance, the relationship between the molar concentration and the current is as shown in (b) of FIG. 6. In general, the resistance and the current follow Ohm's Law, I=V/R. However, in the ionic touch panels 10 to 40 of the present invention, the current does not follow Ohm's Law. Instead, the highest current value is measured at the lowest molar concentration, 0.01M (the highest resistance), and the lowest current value is measured at the highest molar concentration, 2M (the lowest resistance).

Volatility of Ionic Touch Panels 10 to 40

Volatility of hydrogel is a significant factor for maintaining the shape of the hydrogel in the air. Due to hygroscopic properties for preventing evaporation of moisture from the hydrogel, LiCl salt is used as a charge carrier for a touch panel.

Figure 7:
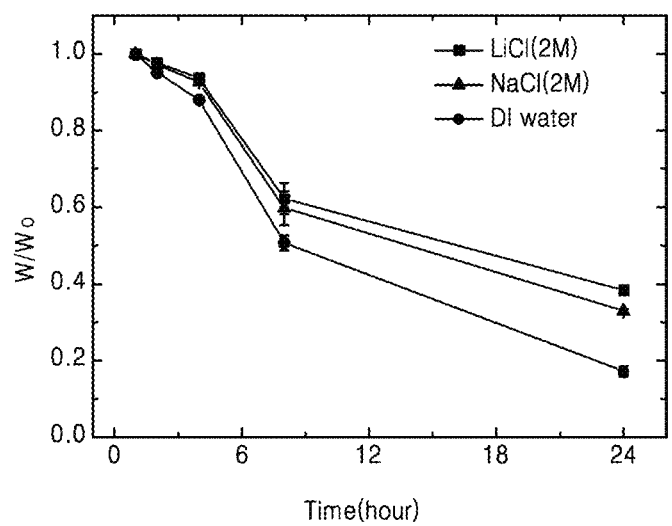
FIG. 7 is a graph showing a volatility test result of an ionic touch panel according to an embodiment of the present invention, based on time.

FIG. 7 is a graph showing a volatility test result of an ionic touch panel 10, 20, 30 or 40 according to an embodiment of the present invention, based on time.

Volatilities of three hydrogel samples including LiCl, NaCl, and DI water are compared. The samples may have a diameter of 2 cm and a thickness of 3 mm, and may be cut (with a power of 80% and at a speed of 3 cm/sec.) using a laser cutter (VLS3.50, Universal Laser System). The volatilities are measured using a vacuum desiccator and a diaphragm vacuum pump (MZ 2C-NT, c). The pressure inside the desiccator is equal to or lower than 0.02 atm. It is shown that the LiCl hydrogel sample has a high humidity-maintaining effect in a vacuum state compared to the NaCl and DI water hydrogel samples.

Rectangular Ionic Touch Panel 20

A 2D ionic touch panel 20 expanded from the 1D ionic touch panel 10 will now be described.

Figure 8:
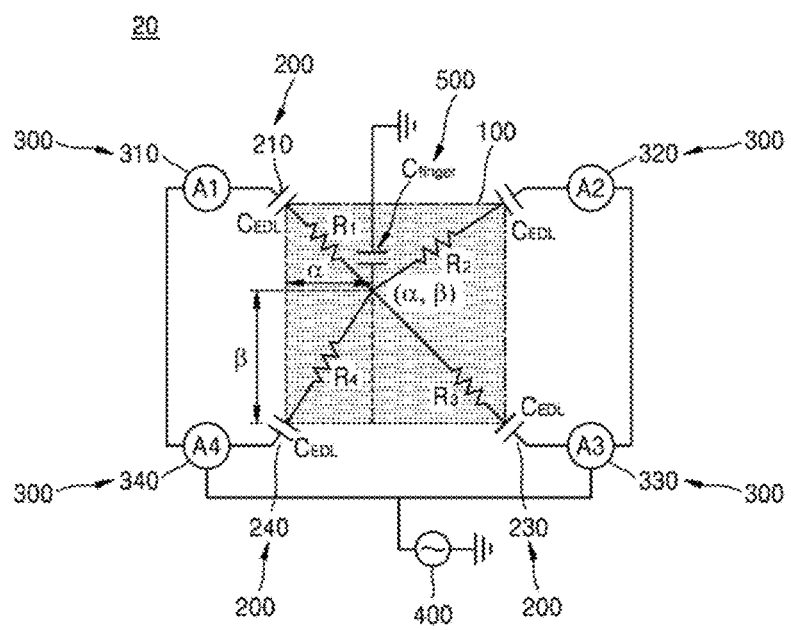
FIG. 8 is a schematic view of a rectangular ionic touch panel according to a second embodiment of the present invention.
Figure 9:
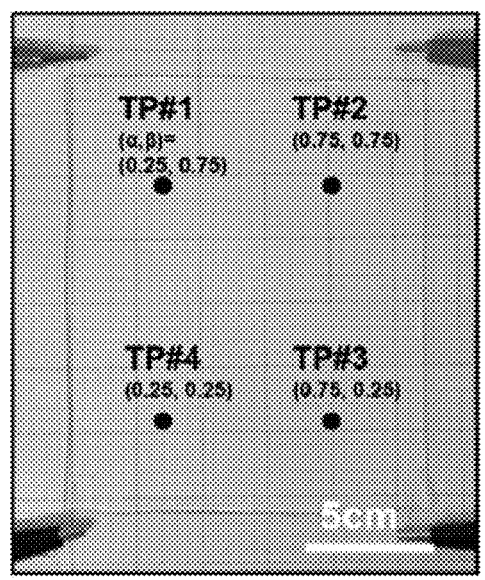
FIG. 9 is a view showing example touch points of the ionic touch panel according to the second embodiment of the present invention.

FIG. 8 is a schematic view of a rectangular ionic touch panel 20 according to a second embodiment of the present invention. FIG. 9 is a view showing example touch points TP1 to TP4 of the ionic touch panel 20 according to the second embodiment of the present invention. The rectangular ionic touch panel 20 may be understood as a 2D ionic touch panel 20.

Referring to FIGS. 8 and 9, Pt electrodes 200 (including 210 to 240) may be connected to four corners of a rectangular hydrogel touch unit 100. Four current meters 300 (including 310 to 340) may be provided between the power source 400 and the four corners. Two standardized distances α and β are used to indicate a touch location. A bottom left end of the rectangular hydrogel touch unit 100 may be indicated by (0.0) and a top right end thereof may be indicated by (1.1).

Figure 10:
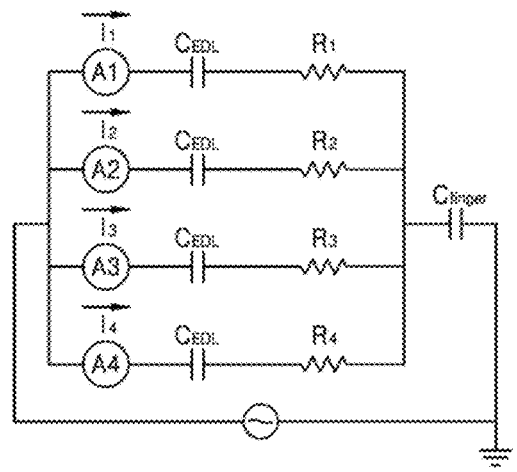
FIG. 10 is a view showing an electrical circuit in a case when the ionic touch panel according to the second embodiment of the present invention is touched.

FIG. 10 is a view showing an electrical circuit in a case when the ionic touch panel 20 according to the second embodiment of the present invention is touched.

When the rectangular hydrogel touch unit 100 is touched with the finger 500, a closed circuit may be generated as illustrated in FIG. 10. As described above in relation to FIG. 2 according to the first embodiment, the rectangular hydrogel touch unit 100 may be divided into four virtual resistive parts by a touch point. The four resistive parts are connected in parallel with each other, and such a parallel circuit may be connected in series with a capacitor $C_{finger}$ generated by the finger 500.

Figure 11:
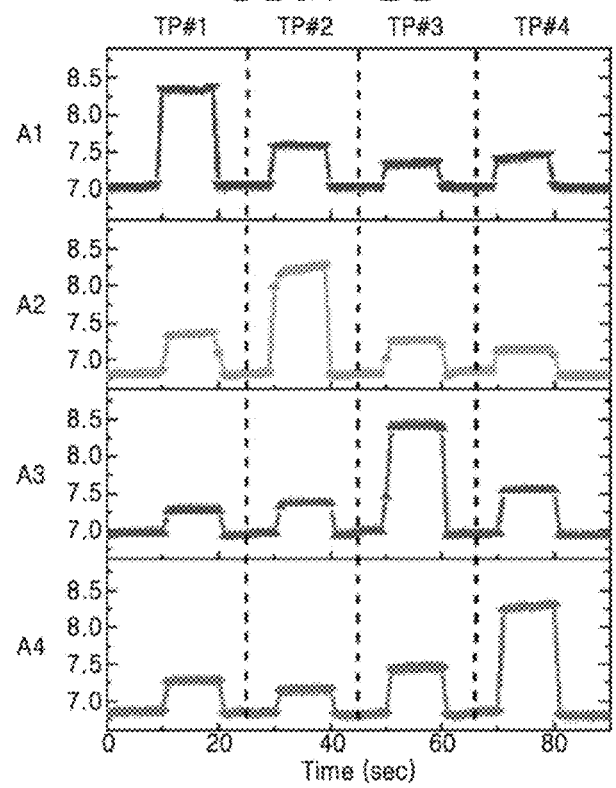
FIG. 11 is a graph showing a current measurement result of the ionic touch panel according to the second embodiment of the present invention, based on the touch points.

FIG. 11 is a graph showing a current measurement result of the ionic touch panel 20 according to the second embodiment of the present invention, based on the touch points TP1 to TP4.

The touch points TP1 to TP4 for the test are set as TP1=(0.25, 0.75), TP2=(0.75, 0.75), TP3=(0.75, 0.25), and TP4=(0.25, 0.25) as shown in FIG. 9, and may be sequentially touched. Currents may be measured by A1 to A4 current meters 310 to 340 located at the corners. As shown in FIG. 11, when the touch point TP1 is touched, the highest current value is measured by the A1 current meters 310 closest to the touch point TP1, and the lowest current value is measured by the A3 current meters 330 farthest from the touch point TP1. Similarly to the strip-shaped ionic touch panel 10, in the 2D ionic touch panel 20, current values are measured in proportion to proximities between the electrodes 200 (including 210 to 240) and the touch points TP1 to TP4. Location information of a touch point on the 2D ionic touch panel 20 may be calculated based on the current values.

Touch Panel System and Example of Driving Operation of Rectangular Ionic Touch Panel 20

Figure 12:
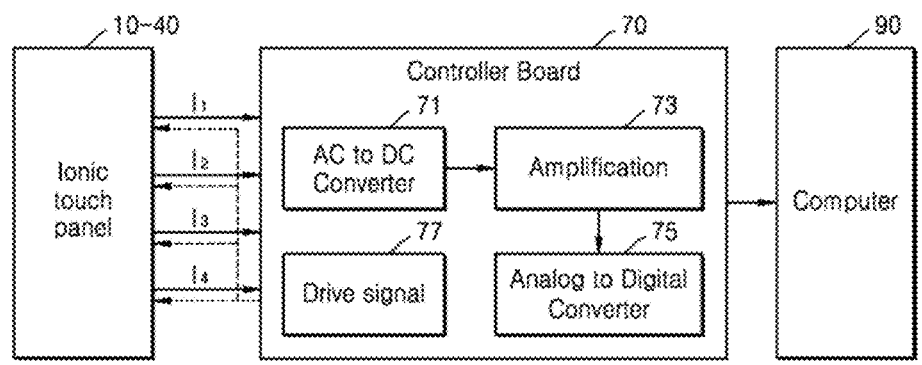
FIG. 12 is a block diagram of a touch panel system according to an embodiment of the present invention.

FIG. 12 is a block diagram of a touch panel system according to an embodiment of the present invention.

Referring to FIG. 12, a controller board 70 may be designed for communications between the ionic touch panel 10-40 and a computer 90. In the controller board 70, a driving signal unit 77 may generate a driving voltage signal which may be applied to the electrodes 200 of the ionic touch panel 10-40. The controller board 70 may measure a current of several mA flowing through each electrode 200, and an alternating current (AC)-to-direct current (DC) converter 71 may convert the current into a DC current. To calculate a location of a touch point, an amplification unit 73 may amplify the current, and an analog-to-digital converter 75 may convert the current into a digital current signal. The controller board 70 may calculate the location of the touch point based on the currents. Location information may be transmitted to the computer 90, and the computer 90 may display the location information on a monitor M1 or M2 (see FIG. 13). Although the computer 90 is illustrated as an example, the computer 90 may be replaced by a terminal device such as a smartphone, a personal digital assistant (PDA), or a tablet. In addition, although the ionic touch panel 10-40, the controller board 70, and the computer (or terminal device) 90 are illustrated as separate elements, the three elements may be integrated into a single device. For example, the ionic touch panel 10-40 may be provided on a surface of a smartphone, a central processing unit (CPU) of the smartphone may serve as the controller board 70, and a display of the smartphone may display the location information instead of the monitor M1 or M2.

Since the currents are inversely proportional to each other, the location information of the touch point may be expressed as shown in Equations 10 and 11.

$$\alpha \propto (I_2+I_3)/(I_1+I_2+I_3+I_4) \quad \text{[Equation 10]}$$

$$\beta \propto (I_1+I_2)/(I_1+I_2+I_3+I_4) \quad \text{[Equation 11]}$$

The currents increased by the touch and measured by the A1 to A4 current meters 310 to 340 are denoted by $I_1$ to $I_4$. As shown in FIG. 11, when points with the same α coordinate are touched, equal values are calculated by Equation 10. For example, for the touch points (0.25, 0.25) and (0.25, 0.75), equal values of 0.517 are calculated by Equation 10. The principle of the α coordinate is equally applicable to a β coordinate.

Figure 13:
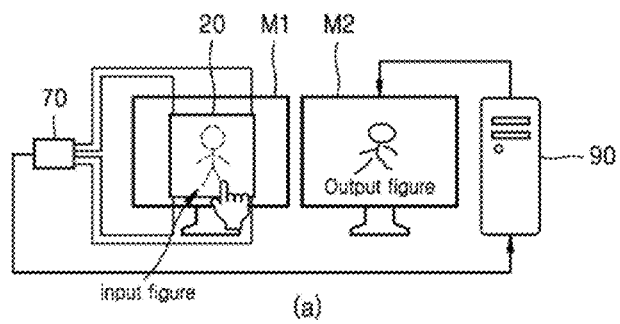
FIGS. 13A, 13B and 14 illustrate images showing a driving operation of the ionic touch panel according to the second embodiment of the present invention.
Figure 13:
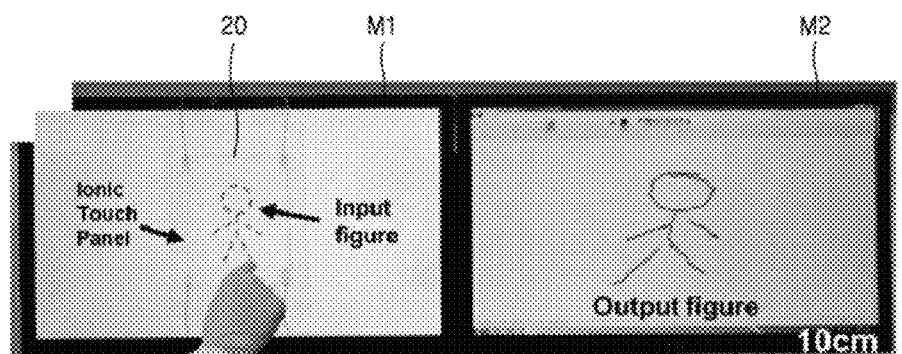
Figure 14:
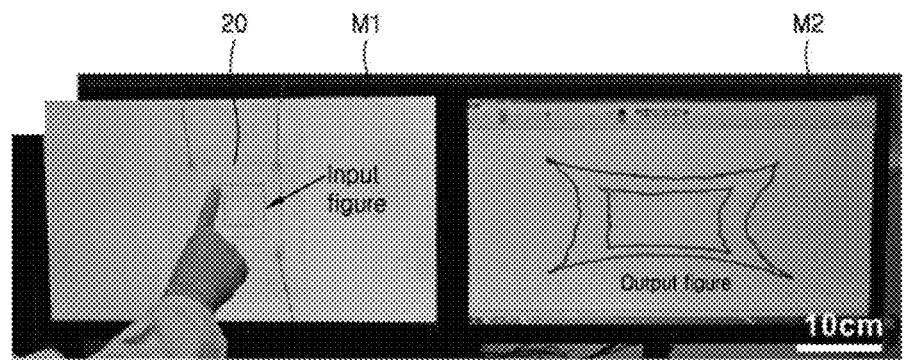

FIGS. 13 and 14 illustrate images showing a driving operation of the ionic touch panel 20 according to the second embodiment of the present invention.

The rectangular ionic touch panel 20 having an input figure displayed thereon may be attached to a monitor1 M1. A polymethyl methacrylate (PMMA) plate having a thickness of 1 mm may be inserted between the ionic touch panel 20 and the monitor1 M1 as an electrical insulator. The ionic touch panel 20 is connected through the controller board 70 to the computer 90. When the finger 500 touches the monitor1 M1 along the input figure, the computer 90 may display an output figure on a monitor2 M2 based on location information received from the controller board 70. Some distortion is observed at corners of the output figure. As shown in FIG. 14, when two rectangles having the same center are drawn, distortion more severely occurs in an outer rectangle.

Figure 15:
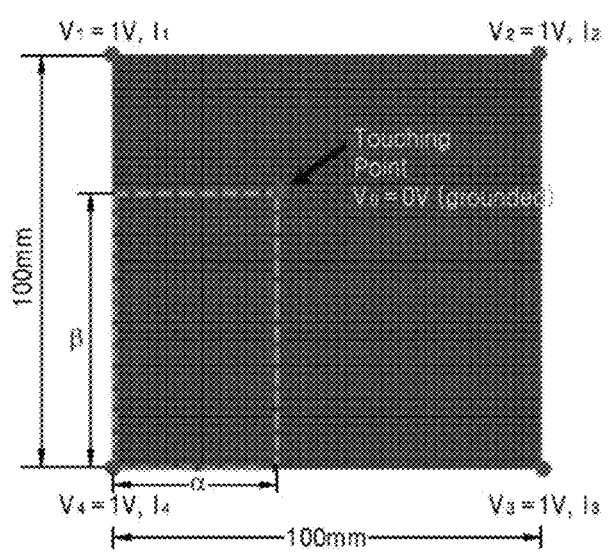
FIG. 15 is a view showing a boundary condition of the ionic touch panel according to the second embodiment of the present invention.
Figure 16:
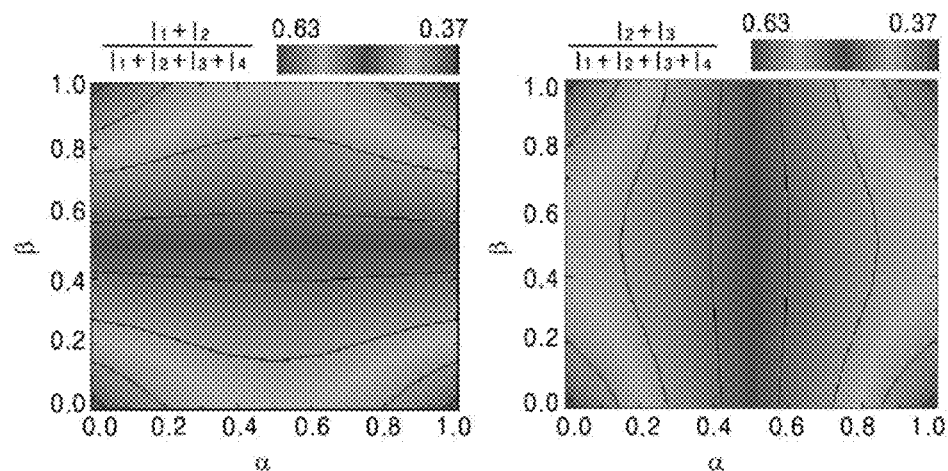
FIG. 16 illustrates graphs showing a current simulation result of the ionic touch panel according to the second embodiment of the present invention.

FIG. 15 is a view showing a boundary condition of the ionic touch panel 20 according to the second embodiment of the present invention. FIG. 16 illustrates graphs showing a current simulation result of the ionic touch panel 20 according to the second embodiment of the present invention.

To analyze distortion described above in relation to FIGS. 13 and 14, an electrical finite element simulation is performed. The boundary condition is illustrated in FIG. 15, and currents flowing through four corners with respect to various touch points (α, β) are calculated. A uniform electrical conductivity (e.g., 1 S/m) is applied to the whole ionic touch panel 20, and potentials of four corners are fixed to 1V. The ionic touch panel 20 is divided into 10 grids in a matrix. Cross points of the grids, which are regarded as touch points, are sequentially grounded (0V), and coordinates (α, β) are calculated based on distances of the grids. Current $I_1$, $I_2$, $I_3$, and $I_4$ from each touch point are converted based on $(I_2+I_3)/(I_1+I_2+I_3+I_4)$ and $(I_1+I_2)/(I_1+I_2+I_3+I_4)$, and are illustrated in (a) and (b) of FIG. 16. As shown in FIG. 16, contour lines near the center of the ionic touch panel 20 are more gradual than those near the corners. Touch points along one contour line are regarded as having the same β coordinate. Additionally, the controller board 70 may compensate the location information to prevent distortion.

Circular Ionic Touch Panel 30

Figure 17:
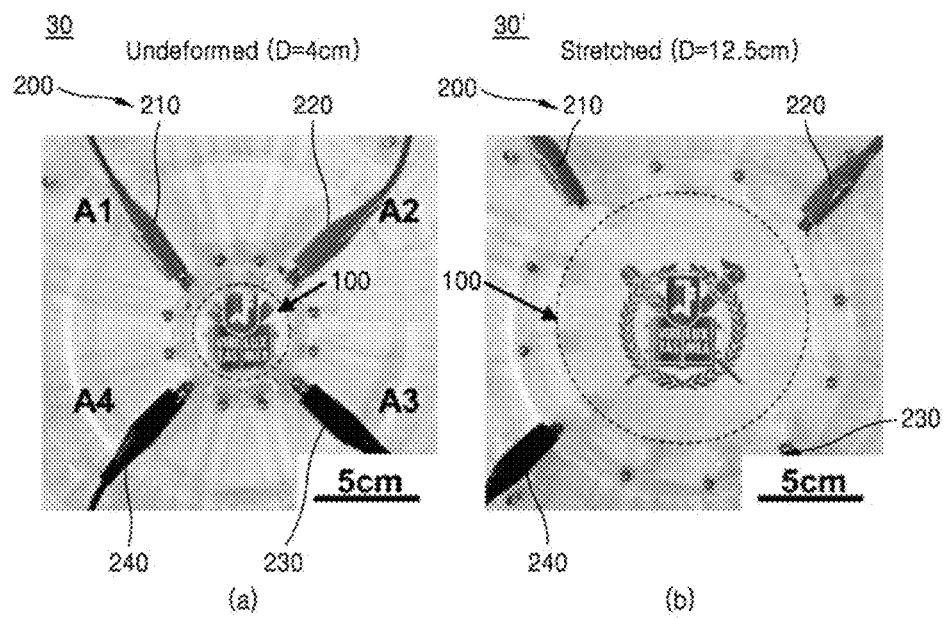
FIGS. 17A and 17B show images of a circular ionic touch panel and a stretched ionic touch panel according to a third embodiment of the present invention.
Figure 18:
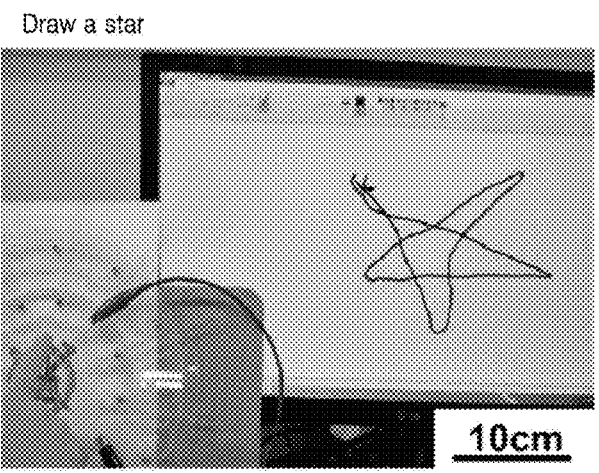
FIG. 18 is an image showing a driving operation of the ionic touch panel according to the third embodiment of the present invention.
Figure 19:
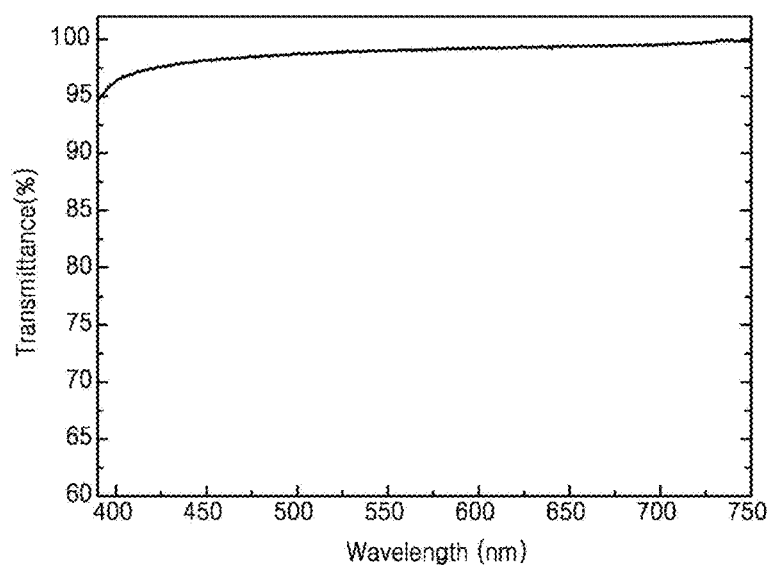
FIG. 19 is a graph showing a transmittance of a hydrogel touch unit according to an embodiment of the present invention, in a visible light band.

Stretchability of an ionic touch panel 30 will now be mainly described. FIG. 17 shows images of a circular ionic touch panel 30 ((a) of FIG. 17) and a stretched ionic touch panel 30' ((b) of FIG. 17) according to a third embodiment of the present invention. FIG. 18 is an image showing a driving operation of the ionic touch panel 30' according to the third embodiment of the present invention. FIG. 19 is a graph showing a transmittance of the hydrogel touch unit 100 according to an embodiment of the present invention, in a visible light band.

Referring to (a) of FIG. 17, the circular ionic touch panel 30 having a diameter of 4 cm and a biaxial stretcher are prepared. The circular ionic touch panel 30 is attached to the biaxial stretcher and is connected through the Pt electrodes 200 to the controller board 70. As illustrated in (b) of FIG. 17, when the diameter of the circular ionic touch panel 30 increases to 12.5 cm, an area thereof increases to about 1,000%. Referring to FIG. 18, the ionic touch panel 30' may also be driven in the stretched state and, for example, a star may be drawn using the stretched ionic touch panel 30'.

In addition, before and after being stretched, optical data (image) behind the circular ionic touch panel 30 may be clearly transmitted. Referring to FIG. 19, a result of measuring a transmittance $T=I/I_0$ (where I denotes the intensity of transmitted light and $I_0$ denotes the intensity of irradiated light) of PAAm gel containing LiCl salt, by using an ultraviolet-visible (UV-Vis) spectrophotometer (Agilent, cary-60) and an acrylic cuvette. A high transmittance of about 98% is observed over an entire visible light band (380 nm to 750 nm). Although the transmittance may decrease as the thickness of the ionic touch panel 30 increases, hydrogel having a thickness of 3 mm may be used in the ionic touch panel 30 without blocking optical data.

Figure 20:
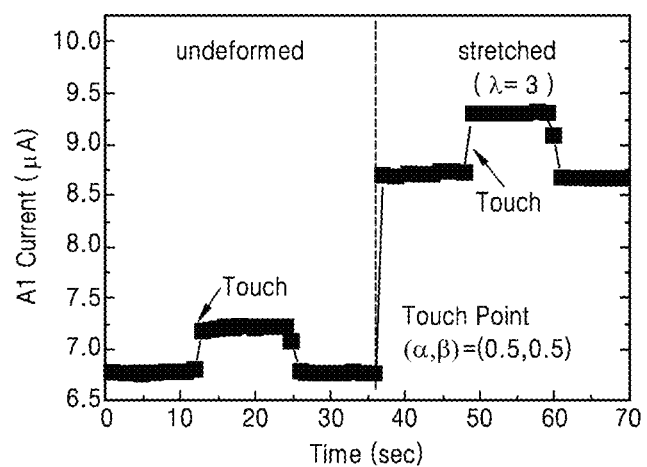
FIG. 20 is a graph showing a current measurement result before and after the ionic touch panel according to the third embodiment of the present invention is stretched.

FIG. 20 is a graph showing a current measurement result before and after the ionic touch panel 30 according to the third embodiment of the present invention is stretched.

Before and after being stretched, A1 current values of center touch points of the ionic touch panels 30 and 30' are measured as shown in FIG. 20. After being stretched, a baseline current increases from 6.76 μA to 8.66 μA. The increase in the baseline current is regarded as being caused by an increase in an area due to the stretching and by bad insulation from a ground environment, e.g., the air.

When the stretched ionic touch panel 30' is touched, a touch current is added to the baseline current. The touch current in the stretched state is 0.53 A, which is similar to a touch current of 0.48 A in the state before being stretched. Even when stretched, a touch current is hardly influenced. The inversely proportional relationship between a distance and a current is maintained in the stretched state.

Figure 21:
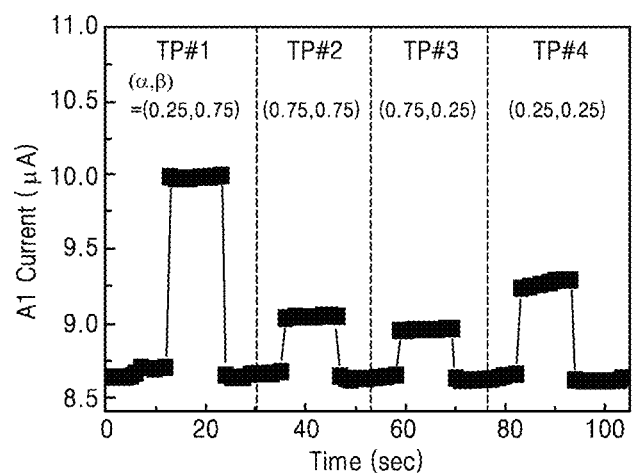
FIG. 21 is a graph showing a current measurement result of the ionic touch panel according to the third embodiment of the present invention, based on the touch points.

FIG. 21 is a graph showing a current measurement result of the ionic touch panel 30' according to the third embodiment of the present invention, based on the touch points TP1 to TP4.

The four touch points TP1 to TP4 on the stretched ionic touch panel 30' may be set as TP1=(0.25, 0.75), TP2=(0.75, 0.75), TP3=(0.75, 0.25), and TP4=(0.25, 0.25), and may be sequentially touched. Since a distance from the touch point TP1 to the A1 current meter 310 is small, an increment in the touch current of the touch point TP1 is greater than those of the other touch points. Accordingly, it is shown that the touch current is inversely proportional to the distance from the electrode 200 and the current meter 300 regardless of whether the ionic touch panel 30 is stretched.

Repeated Stretchability Test of Ionic Touch Panels 10 to 40

Figure 22:
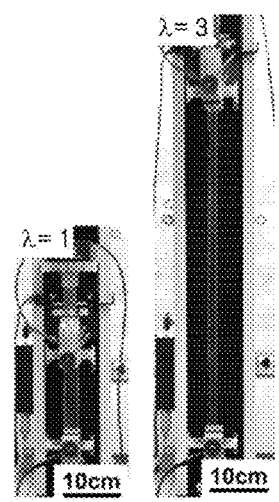
FIG. 22 is an image of a mechanical-electrical tester for measuring repeated stretchability of an ionic touch panel according to an embodiment of the present invention.
Figure 23:
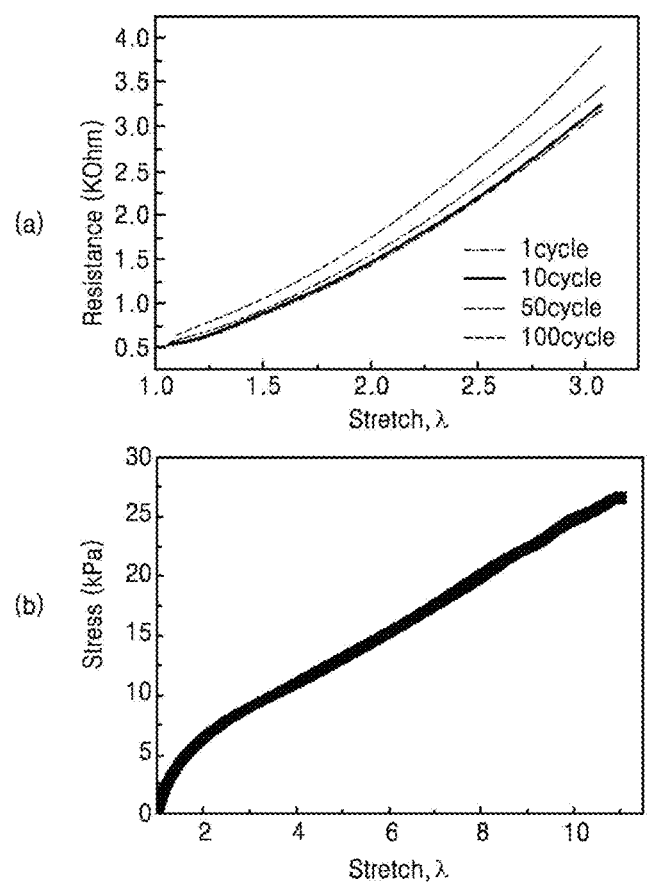
FIGS. 23A and 23B illustrate graphs showing test results using the tester of FIG. 22.

FIG. 22 is an image of a mechanical-electrical tester for measuring repeated stretchability of an ionic touch panel according to an embodiment of the present invention. FIG. 23 illustrates graphs showing test results using the tester of FIG. 22.

Mechanical-electrical stability may be tested by repeatedly loading a sample a hundred times. Strip-shaped PAAm hydrogel having a size of 2 cm×15 cm×3 mm and containing 2M LiCl salt is uniaxially and repeatedly stretched up to a stretchability of λ=3. A resistance of the hydrogel is measured using Pt electrodes and an LCR meter (E4980AL-100, Agilent). Two clamps (7 cm×2 cm×3 mm) are attached to 5 mm-points from upper and lower ends of the strip-shaped hydrogel. Two ends of the hydrogel are connected through the Pt electrodes to the LCR meter, and upper and lower parts of the strip-shaped hydrogel to which the Pt electrodes are connected are not stretched during the repeated stretchability test. When not deformed, the length of a substantially stretchable part between the two clamps is 12 cm. The test is performed by a testing machine with a 50N capacity load cell (Instron model 3343).

FIG. 23 shows a resistance measurement result based on cycles of 1, 5, 10, and 100 ((a) of FIG. 23). A largest variation of 25% is obtained when $\lambda=3$, and the resistance rapidly increases as the number of cycles increases. The increase in the resistance during the repeated stretchability test is regarded as being caused by evaporation of moisture from the hydrogel. In (b) of FIG. 23, the uniaxial stretchability test is performed on a PAAm hydrogel sample containing 2M LiCl salt and having a size of 4 cm×5 cm×3 mm. It is shown that an elastic modulus of the hydrogel sample is about 4 kPa and a maximum uniaxial elongation thereof is $\lambda=11$.

Ionic Touch Panel 40 as Epidermal Touch Panel

An ionic touch panel 40 integrable into or attachable to a body part will now be described. In this specification, an ionic touch panel 40 according to a fourth embodiment is called an epidermal touch panel.

Figure 24:
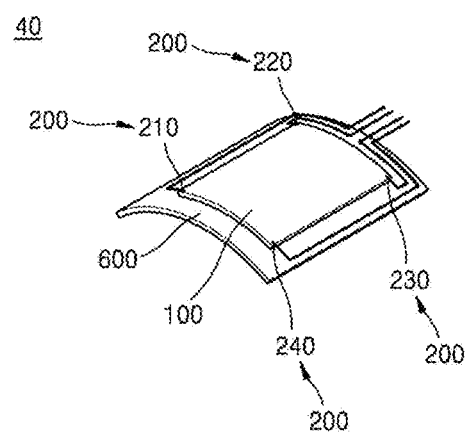
FIG. 24 is a schematic view of an ionic touch panel configured as an epidermal touch panel, according to a fourth embodiment of the present invention.
Figure 25:
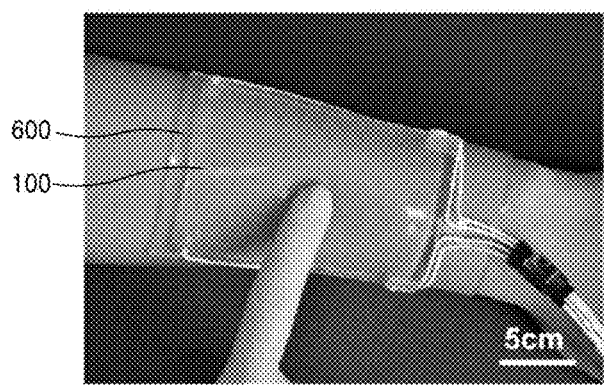
FIG. 25 is an image showing that the epidermal touch panel according to the fourth embodiment of the present invention is attached to a body part.

FIG. 24 is a schematic view of an ionic touch panel 40 configured as an epidermal touch panel, according to a fourth embodiment of the present invention. FIG. 25 is an image showing that the epidermal touch panel 40 according to the fourth embodiment of the present invention is attached to a body part.

The epidermal touch panel 40 may be configured by mounting the hydrogel touch unit 100 on a substrate 600. The electrodes 200 may be connected to corners of the hydrogel touch unit 100. The substrate 600 may attach the hydrogel touch unit 100 to a body part and, at the same time, insulate the hydrogel touch unit 100. The substrate 600 may use 1 mm VHB™ film (3M). However, the substrate 600 is not limited thereto and any other known attachment means capable of insulating the hydrogel touch unit 100 and attaching the hydrogel touch unit 100 to a body part may also be used.

As shown in FIG. 25, the epidermal touch panel 40 may be attached to a body part such as an arm. The epidermal touch panel 40 is completely transparent and thus visual content behind the epidermal touch panel 40 may be transmitted therethrough. In addition, the epidermal touch panel 40 is soft and stretchable and thus may allow comfortable motion when worn by a user.

Figure 26:
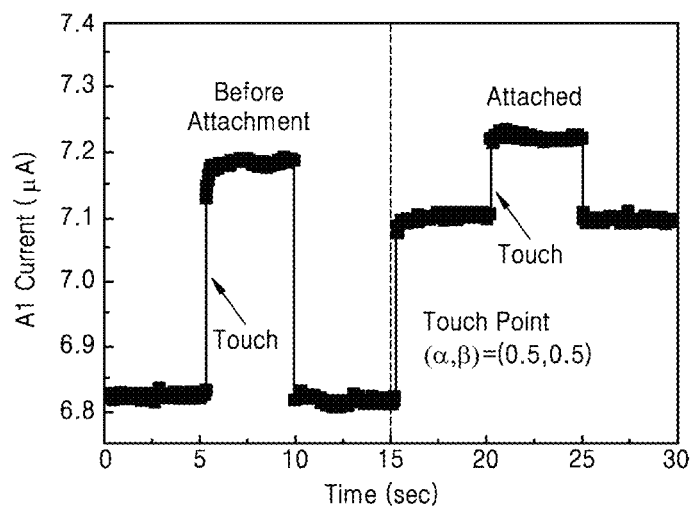
FIG. 26 is a graph showing a current measurement result before and after a substrate is attached to the ionic touch panel according to the fourth embodiment of the present invention.
Figure 27:
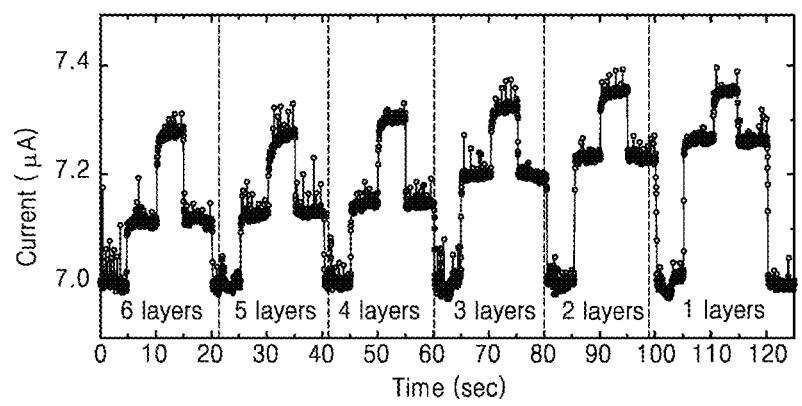
FIG. 27 is a graph showing current variations of the ionic touch panel according to the fourth embodiment of the present invention, based on the thickness of the substrate.

FIG. 26 is a graph showing a current measurement result before and after the substrate 600 is attached to the ionic touch panel 40 according to the fourth embodiment of the present invention. FIG. 27 is a graph showing current variations of the ionic touch panel 40 according to the fourth embodiment of the present invention, based on the thickness of the substrate 600.

Referring to FIG. 26, it is shown that a baseline current increases after the substrate 600 is attached to the hydrogel touch unit 100. To acquire information about the relationship between current leakage and the thickness of the substrate 600 serving as an insulating layer, an acrylic plate having a thickness of 1 mm is used as the substrate 600. The thickness of the substrate 600 is reduced from 6 mm to 1 mm based on time. As shown in FIG. 27, a leakage current is reduced by about 0.02 mA whenever the thickness of the substrate 600 is reduced by 1 mm. A current induced due to attachment of the epidermal touch panel 40 including the substrate 600 having a thickness of 1 mm is 0.25 mA.

A touch current of a touch point at a center ($\alpha=0.5$, $\beta=0.5$) of the epidermal touch panel 40 is 0.36 μA when the epidermal touch panel 40 is not attached to the skin, and is reduced to 0.12 μA when the epidermal touch panel 40 is attached to the skin. However, the current signal has a value sufficient to detect a touch location.

When the epidermal touch panel 40 is attached to the skin, a leakage current increases through the skin and thus a baseline current also increases. As a result, the increase in the leakage current causes an increase in a baseline current and a reduction in a touch current. Since the reduction in the touch current influences sensitivity of the epidermal touch panel 40, insulation of the epidermal touch panel 40 needs to be considered all the time. In the epidermal touch panel 40 of the present invention, although a low leakage current flows through the skin in spite of the insulating substrate 600, since a measurable touch current is detected due to a touch, the epidermal touch panel 40 may be normally driven on the skin.

Figure 28:
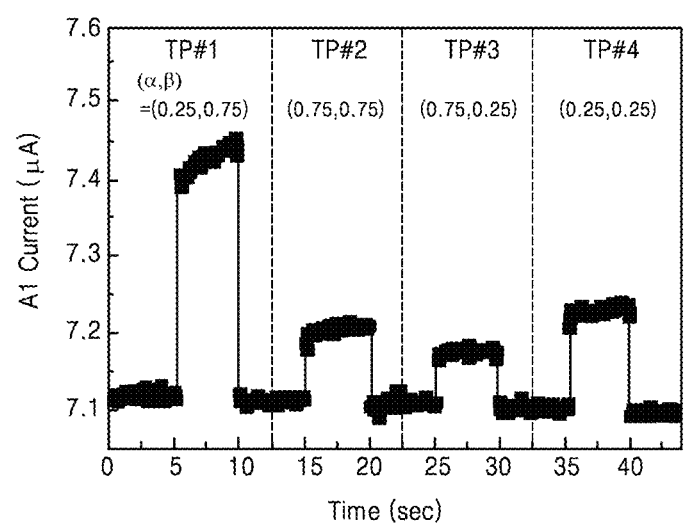
FIG. 28 is a graph showing a current measurement result of the ionic touch panel according to the fourth embodiment of the present invention, based on the touch points.
Figure 29:
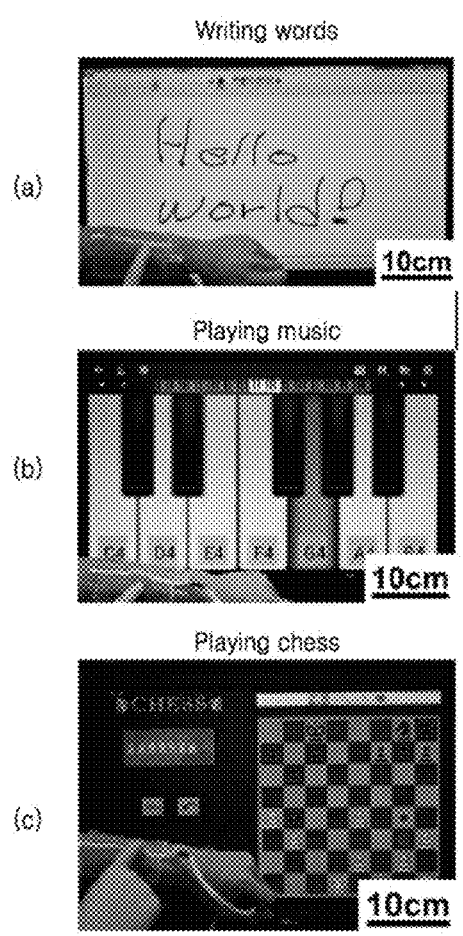

FIG. 28 is a graph showing a current measurement result of the ionic touch panel 40 according to the fourth embodiment of the present invention, based on the touch points TP1 to TP4. FIG. 29 illustrates images showing various application examples of the ionic touch panel 40 according to the fourth embodiment of the present invention.

The touch points TP1 to TP4 on the epidermal touch panel 40 are sequentially touched, and currents from the A1 current meter 310 are measured. An increase in a current due to a touch is 0.6 μA to 1.4 μA before the epidermal touch panel 40 is attached to a body part, and is reduced to 0.07 μA to 0.34 μA after the epidermal touch panel 40 is attached to a body part. However, attachment of the epidermal touch panel 40 to a body part does not influence the relationship between a current and a touch location. Referring to FIG. 29, the epidermal touch panel 40 of the present invention may detect various motions such as tapping, holding, dragging, and swiping, and may be used to write letters, play music, play chess, etc. through appropriate motions.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A capacitive touch sensor method configured to operate on a capacitive ionic touch panel system comprising: a capacitive ionic touch panel comprising a hydrogel touch unit containing salt; electrodes connected to at least two parts of the hydrogel touch unit; and a controller board electrically connected to the capacitive ionic touch panel to calculate a location of a touch point where a touching object touches the surface of the hydrogel touch unit, wherein the method comprising calculating a touch current, the touch current being induced by a capacitive connection between a surface of the hydrogel touch unit and the touching object when the touching object touches the surface of the hydrogel touch unit, calculating a first current flowing through a first region of the hydrogel touch unit and a second current flowing through a second region of the hydrogel touch unit, the hydrogel touch unit being divided into the first and second regions based on the touch point, and determining the location of the touch point by based on the first current and the second current.

2. The capacitive touch sensor method of claim 1, wherein the hydrogel touch unit has a strip, rectangular, or circular shape.

3. The capacitive touch sensor method of claim 2, wherein the hydrogel touch unit has a strip shape, and
wherein the electrodes are connected to two ends of the hydrogel touch unit.

4. The capacitive touch sensor method of claim 3, wherein, assuming that the hydrogel touch unit has a length L and a total current It flows through the hydrogel touch unit, when the hydrogel touch unit is touched at a point corresponding to a length $\alpha L$ from an end of the hydrogel touch unit and a length $(1-\alpha)L$ from the other end of the hydrogel touch unit, a touch location $\alpha$ is calculated using Equation (1) expressed as $(1-\alpha)=I_1/I_t$ and Equation (2) expressed as $\alpha=I_2/I_t$ (where I1 denotes a current measured at the end and $I_2$ denotes a current measured at the other end, and $0\leq\alpha\leq1$).

5. The capacitive touch sensor method of claim 4, wherein, assuming that a current measured at an end of the hydrogel touch unit is denoted by $I_1$ and a current measured at the other end of the hydrogel touch unit is denoted by $I_2$, a sum of $I_1$ and $I_2$ is constant and $I_1$ and $I_2$ have values inversely proportional to each other based on a touch location of the hydrogel touch unit.

6. The capacitive touch sensor method claim 1, wherein the salt has a molar concentration of 0.01M to 2M.

7. The capacitive touch sensor method of claim 6, wherein magnitudes of a baseline current and a touch current flowing through the hydrogel touch unit decrease as the molar concentration of the salt increases.

8. The capacitive touch sensor method of claim 7, wherein the hydrogel touch unit has a rectangular shape, and
wherein the electrodes are connected to four corners of the hydrogel touch unit.

9. The capacitive touch sensor method of claim 8, wherein, when the hydrogel touch unit is touched, touch currents are induced from the electrodes connected to the corners, to a touch point, and a location of the touch point is calculated based on values of the touch currents.

10. The capacitive touch sensor method of claim 9, wherein a magnitude of a touch current induced from a corner to the touch point increases as a distance between the corner and the touch point decreases.

11. The capacitive touch sensor method of claim 9, wherein, assuming that a touch coordinate on the hydrogel touch unit is $(\alpha, \beta)$ (where $0\leq\alpha\leq1$ and $0\leq\beta\leq1$), $\alpha$ and $\beta$ are calculated using Equation (1) expressed as $\alpha\propto(I_2+I_3)/(I_1+I_2+I_3+I_4)$ and Equation (2) expressed as $\beta\propto(I_1+I_2)/(I_1+I_2+I_3+I_4)$ (where $I_1, I_2, I_3$, and $I_4$ denote currents measured at the four corners of the hydrogel touch unit).

12. The capacitive touch sensor method of claim 1, wherein the hydrogel touch unit has a transmittance of 98% in a visible light band.

13. The capacitive touch sensor method of claim 1, wherein, when the hydrogel touch unit is stretched, a baseline current and a touch current flowing through the hydrogel touch unit increase.

14. The capacitive touch sensor method of claim 1, wherein the hydrogel touch unit is attached to a substrate, and
wherein the substrate is integrable into and insulative to a body part.

15. The capacitive touch sensor method of claim 14, wherein the substrate has a thickness of 1 mm to 6 mm.

16. A capacitive touch sensor method of claim 1, wherein the capacitive touch panel system further comprises:
a terminal device for receiving location information of the touch point from the controller board, and displaying the location information.

* * * * *